United States Patent [19]

Kato

[11] Patent Number: 5,685,075
[45] Date of Patent: Nov. 11, 1997

[54] METHOD FOR BRAZING FLAT TUBES OF LAMINATED HEAT EXCHANGER

[75] Inventor: Soichi Kato, Saitama, Japan

[73] Assignee: Zexel Corporation, Tokyo, Japan

[21] Appl. No.: 600,998

[22] PCT Filed: Jul. 17, 1995

[86] PCT No.: PCT/JP95/01413

§ 371 Date: Mar. 5, 1996

§ 102(e) Date: Mar. 5, 1996

[87] PCT Pub. No.: WO96/02348

PCT Pub. Date: Feb. 1, 1996

[30] Foreign Application Priority Data

Jul. 19, 1994 [JP] Japan ................. 6-166594

[51] Int. Cl.⁶ .................................................. F28F 9/04
[52] U.S. Cl. .................................. 29/890.054; 29/890.043
[58] Field of Search .................. 29/890.054, 890.043; 728/183

[56] References Cited

U.S. PATENT DOCUMENTS

| | | | |
|---|---|---|---|
| 3,855,682 | 12/1974 | Chartet | 29/890.054 |
| 4,377,024 | 3/1983 | Saperstein | 29/890.054 |
| 5,251,374 | 10/1993 | Halstead et al. | 29/890.054 |
| 5,271,151 | 12/1993 | Wallis | 29/890.054 |
| 5,292,056 | 3/1994 | Borchert et al. | 228/183 |
| 5,423,112 | 6/1995 | Murphy et al. | 29/890.054 |

FOREIGN PATENT DOCUMENTS

4062394  4/1992  Japan.

*Primary Examiner*—Irene Cuda
*Attorney, Agent, or Firm*—Kanesaka & Takeuchi

[57] ABSTRACT

The invention relates to a method for brazing flat tubes of a laminated heat exchanger comprising laminating a plurality of flat tubes (2) which have a brazing material claded with a fin (3) therebetween, inserting both ends or at least one end of each flat tube into tube insertion ports (5) of header tanks (4), and integrally brazing the ends of the flat tubes and the tube insertion ports, wherein the tube insertion ports have a width (A) larger than that (B) of the flat tubes, the laminated heat exchanger is transversely placed to vertically position the width direction of the flat tubes when integrally brazing after assembling, and a jig (19) is used to support so as to form a gap (20) at the lower parts of the flat tubes and the tube insertion ports before effecting brazing. Thus, the flat tubes can be firmly inserted when assembling, a brazing property between the tube insertion ports and the flat tubes can be improved, and beads can be mutually brazed with reliability. As a result, a laminated heat exchanger having a pressure resistance can be acquired.

4 Claims, 9 Drawing Sheets

METHOD FOR BRAZING FLAT TUBES OF LAMINATED HEAT EXCHANGER

BACKGROUND ART

This invention relates to a method for brazing flat tubes of a laminated heat exchanger in which tube insertion ports of header tanks and flat tubes to be inserted into the tube insertion ports have an improved brazing property.

A conventionally used laminated heat exchanger has flat tubes laminated and connected to header tanks, and a heat-exchanging medium meandered a plurality of times to flow between inlet and outlet joints disposed on the header tanks.

For such flat tubes of a laminated heat exchanger, various types are known; e.g., (1) made by overlaying two plates having many projections (hereinafter referred to as beads) which are protruded inward to have their ends connected to one another, and brazing joints at both ends of the plates; (2) made by forming many projections (beads) on one plate which has a certain area, folding the plate double at the center, and brazing joints to connect mutually; (3) made by inserting inner fins inside; and (4) made by extrusion molding.

The flat tubes of the above (1) and (2) have a structure that beads cause a heat-exchanging medium to make a turbulent flow within the flat tubes to enhance a heat-exchanging capacity, increase the strength of the tube's flat surfaces, and improve a pressure resistance.

In general the header tanks have tube insertion ports corresponding to the cross sections of the above various flat tubes formed in multiple numbers by pressing or the like, these tube insertion ports being formed to have an external size slightly larger than the cross section of the flat tubes so that the laminated multiple flat tubes can be inserted by a single action, and after insertion, the flat tubes and the tube insertion ports being fitted completely.

And, to assemble a heat exchanger, a jig is used to laminate the multiple flat tubes with fins between respective flat tubes, the both ends of each flat tube are inserted into the tube insertion ports formed in the header tanks, and the both ends of each flat tube are brazed with the tube insertion ports of the header tanks in a furnace (e.g., Japanese Patent Application Laid-open Print No. Hei 4-62394).

But, when a clearance between the tube insertion ports and the flat tubes to be inserted therein is excessive, the flat tubes can be inserted easily, but there is a disadvantage that the flat tubes and the header tanks are not brazed completely.

When the clearance between the tube insertion ports and the flat tubes is too small, the flat tubes are hard to be inserted, making it impossible to assemble, and if they are forcedly assembled, the flat tubes may be crushed, or even if they can be assembled, there is a disadvantage that a lot of steps are required to adjust the assembling.

In particular, the flat tubes which are of the type having two plates of brazing sheet overlaid or of the type having one plate folded are required to be assembled carefully because they become thin.

Besides, with the above flat tubes which are of the type having two plates overlaid or of the type having one plate folded, when the clearance between the tube insertion ports and the flat tubes is made small, the thermal expansion in the breadth direction of the flat tubes upon brazing is limited by the both ends in the width direction of the tube insertion ports of the header tanks, the flat tubes are deformed and expanded in the thickness direction, and respective beads of the flat tubes disposed near the tube insertion ports cannot be contacted mutually, thereby causing a disadvantage that the opposed beads cannot be brazed. As a result, the flat tubes can not acquire a sufficient pressure resistance. For example, flat tubes for a condenser are not satisfactory in terms of a pressure resistance.

In view of the above, this invention aims to provide a method for brazing flat tubes for a laminated heat exchanger in which a brazing property of the tube insertion ports and the flat tubes can be improved while keeping an insertion property of the flat tubes when assembling, and even for the flat tubes which are of the type having two plates overlaid or of the type having one plate folded, the beads can be brazed mutually, and the pressure resistance necessary for condensers can be acquired.

SUMMARY OF THE INVENTION

The invention relates to a method for brazing flat tubes of a laminated heat exchanger comprising laminating a plurality of flat tubes which have a brazing material cladded with fins therebetween, inserting both ends or at least one end of each flat tube into tube insertion ports of header tanks, and integrally brazing the ends of the flat tubes and the tube insertion ports, wherein the tube insertion ports have a width larger than that of the flat tubes, the laminated heat exchanger is transversely placed such that the width direction of the flat tubes become vertical when integrally brazing after assembling, and a jig is used to support so as to form a gap at the lower parts of the flat tubes and the tube insertion ports before effecting brazing.

And, in the method for brazing flat tubes according to the invention, the breadth size of the tube insertion port is formed to be 0.1 mm to 0.4 mm larger than the breadth size of the flat tube.

To produce such a laminated heat exchanger, the insertion ends of a plurality of flat tubes laminated with a corrugated fins between them are inserted into the tube insertion ports of the header tanks. In this case, a single-tank type heat exchanger is assembled by inserting one ends of the flat tubes into the tube insertion ports of the header tank.

To integrally braze after assembling, the laminated heat exchanger is transversely placed such that the width direction of the flat tubes becomes vertical, and a jig is used to support so as to form a gap at the lower parts of the flat tubes and the tube insertion ports when brazing.

And, since the width size of the tube insertion ports is formed larger than the width of the flat tubes, each flat tube has its joint to be positioned at the top of the flat tube contacted to the top end face of the tube insertion port, a gap is formed at the joint between the lower part of the flat tube and the lower end face of the tube insertion port, and the each flat tube is brazed with the gap formed.

Therefore, since the width of the tube insertion ports to be formed on the header tanks is made larger than the width of the flat tubes, the flat tubes can be smoothly inserted when assembling the heat changer, the flat tubes are not crushed due to tight assembling of the flat tubes, adjustment after assembling is not needed, and flat tubes of the type having two thin plates overlaid and of the type having one plate folded can be assembled without any trouble.

Since the tube insertion ports have a large width, the flat tubes are not deformed even when the flat tubes are thermally expanded in the breadth direction when brazing. Thus, the conventionally experienced deformation in the thickness direction of the flat tubes can be prevented, the beads of the flat tubes near the tube insertion ports can be securely brazed mutually, the pressure resistance of the flat tubes can be improved, and they can be satisfactorily used for a condenser.

When brazing, the assembled laminated heat exchanger is transversely placed with the header tanks placed horizontal and the tops of the flat tubes are in contact with the top ends of the tube insertion ports (both-tank type), or the flat tubes are supported by a jig (single-tank type), so that the gap which is formed at the lower end of each of the tube insertion ports can be fully filled with the brazing material flowing from top to bottom, the flat tubes can be firmly brazed with the tube insertion ports, and defective brazing can be prevented.

BEST MODE FOR CARRYING OUT THE INVENTION

[Embodiment]

The invention will be described on the basis of embodiments shown in the attached drawings.

Figure 1:
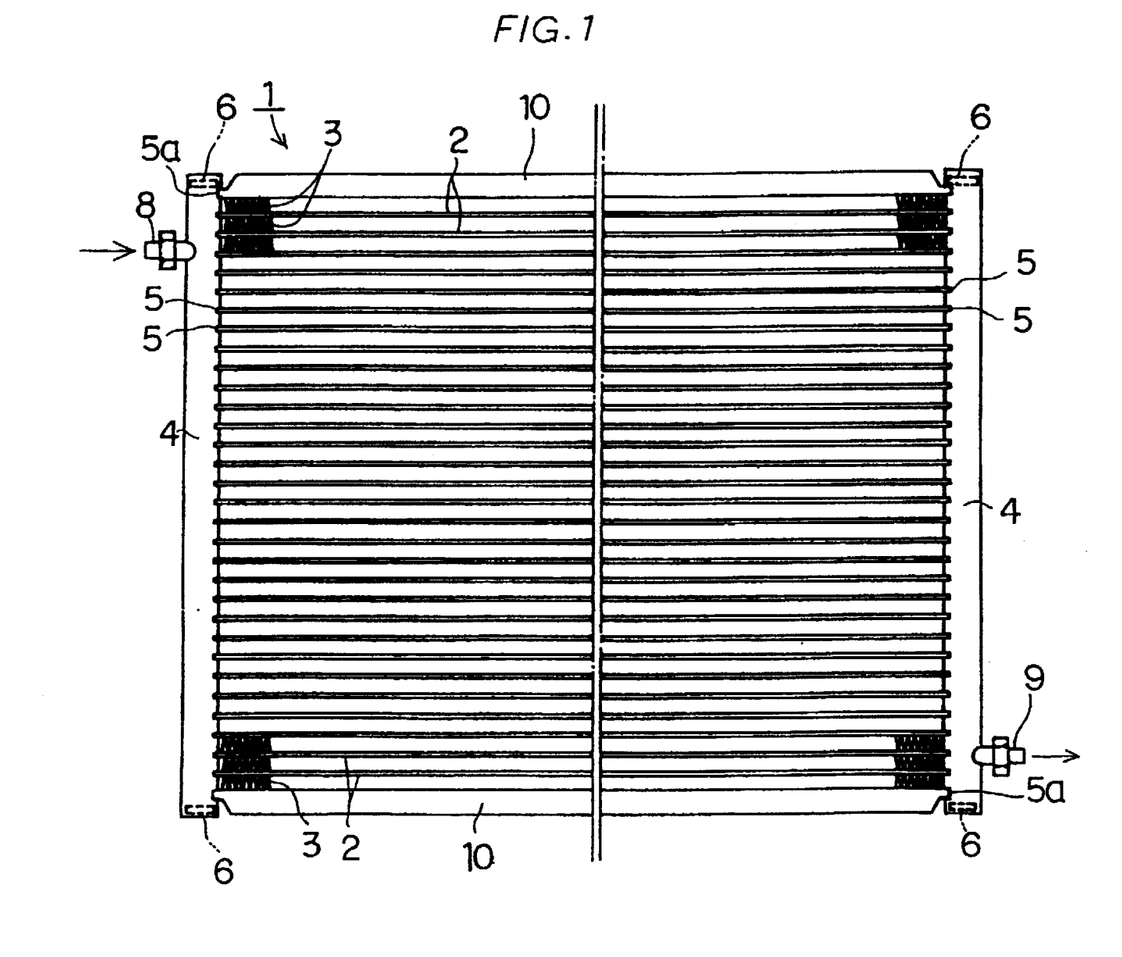
FIG. 1 is a front view of the laminated heat exchanger according to one embodiment of the invention.

As shown in FIG. 1, a laminated heat exchanger 1 of this embodiment has a plurality of flat tubes 2 laminated with corrugated fins 3 therebetween, and respective ends of the plurality of flat tubes 2 inserted into insertion ports 5 which are disposed on header tanks 4. And, top and bottom openings of each header tank 4 are sealed with blank caps 6, and partitions (not shown) are disposed at prescribed positions of the each header tank 4. The header tank 4 is provided with an inlet joint 8 or an outlet joint 9, and a heat-exchanging medium is meandered a plurality of times to flow between the inlet and outlet joints 8, 9. In FIG. 1, reference numeral 10 designates side plates which are disposed at the top and bottom of the laminated flat tubes 2.

Figure 2:
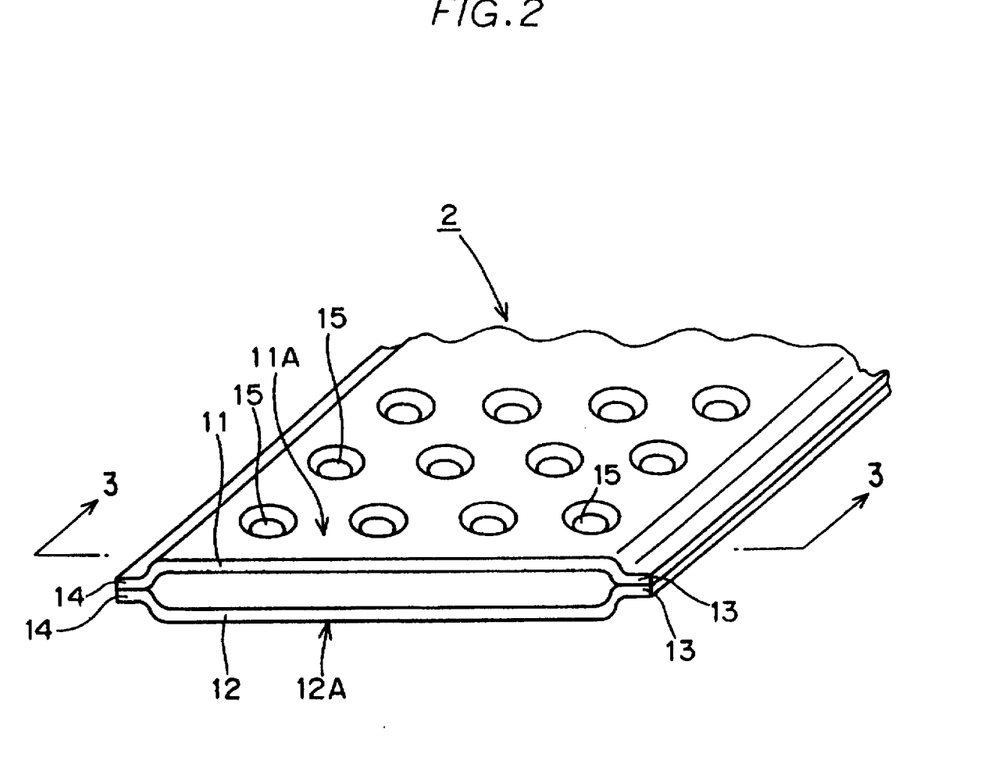
FIG. 2 is a perspective view of a flat tube.
Figure 3:
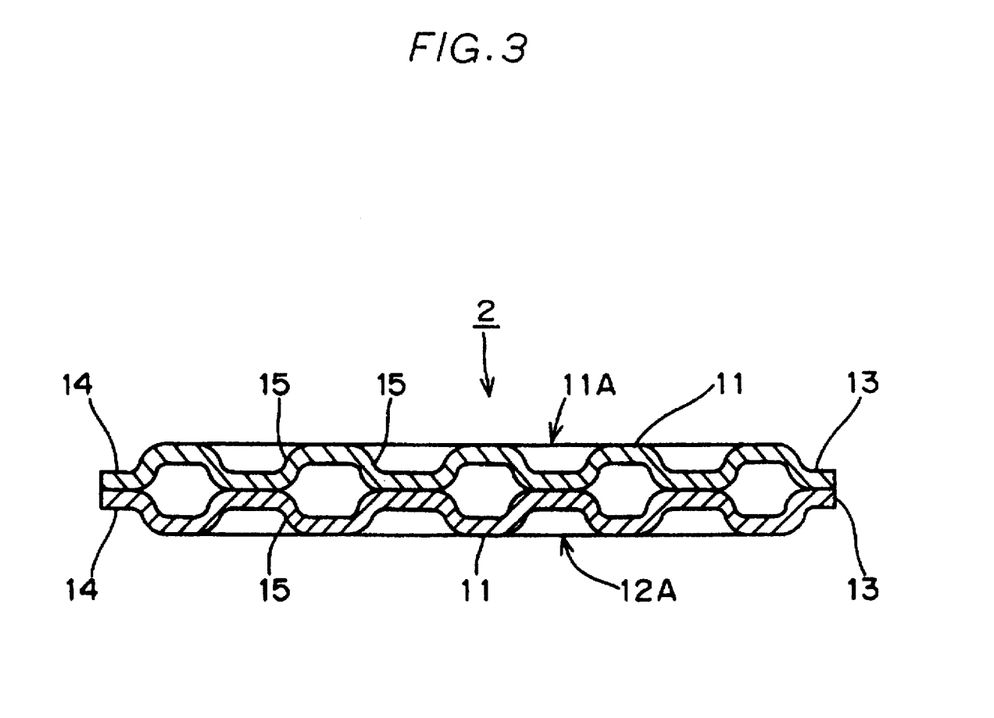
FIG. 3 is a transverse sectional view taken on line A—A of the flat tube shown in FIG. 2.

As shown in FIG. 2 and FIG. 3, the each flat tube 2 is formed by overlaying two plates 11, 12 which are pressed into a prescribed sized-shape. For example, a brazing sheet whose both sides are claded by a brazing material is used. These plates 11, 12 have joints 13, 14 at both ends along a longitudinal direction, and flat faces 11A, 12A are shaped to protrude externally, and each flat face 11A, 12A has many circular beads 15 which are protruded inward to contact their tips mutually.

In FIG. 2, the beads 15 are formed up to the ends of the flat tube 2 which are inserted into the header tanks 4. These beads 15 work to enhance a heat-exchanging capacity by causing the heat-exchanging medium to make a turbulent flow within the tubes to enhance the heat-exchanging capacity, and increase the strength of the tube's flat surfaces 11A, 12A to improve a pressure resistance.

Figure 4:
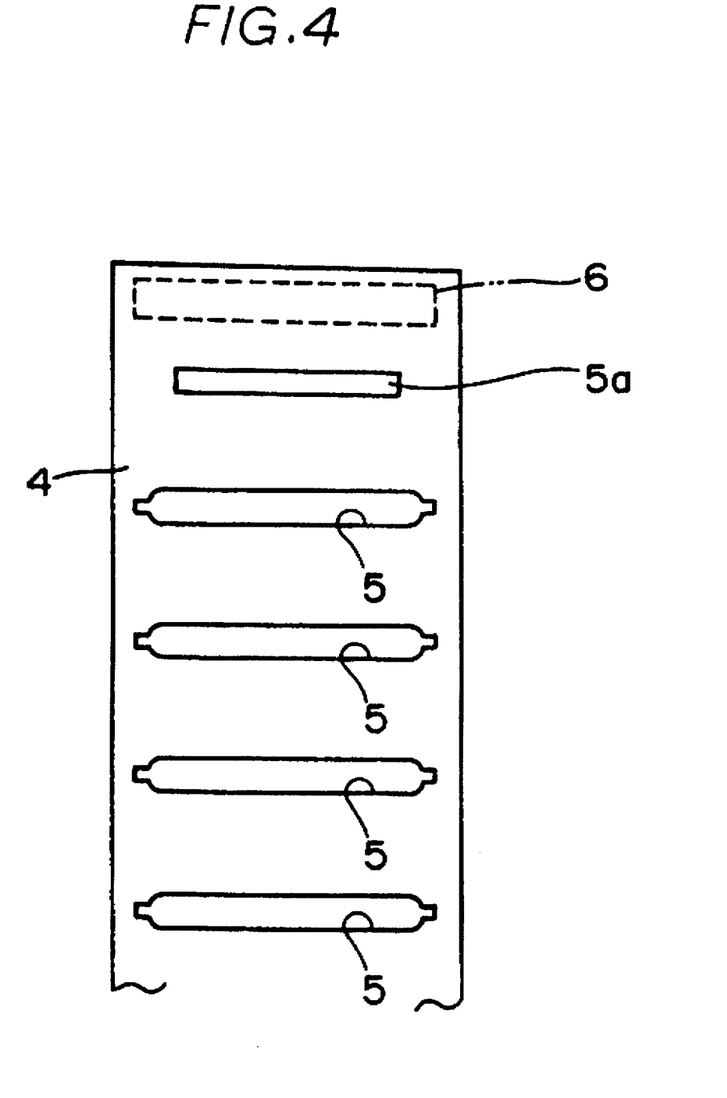
FIG. 4 is a front view showing a header tank.
Figure 5:
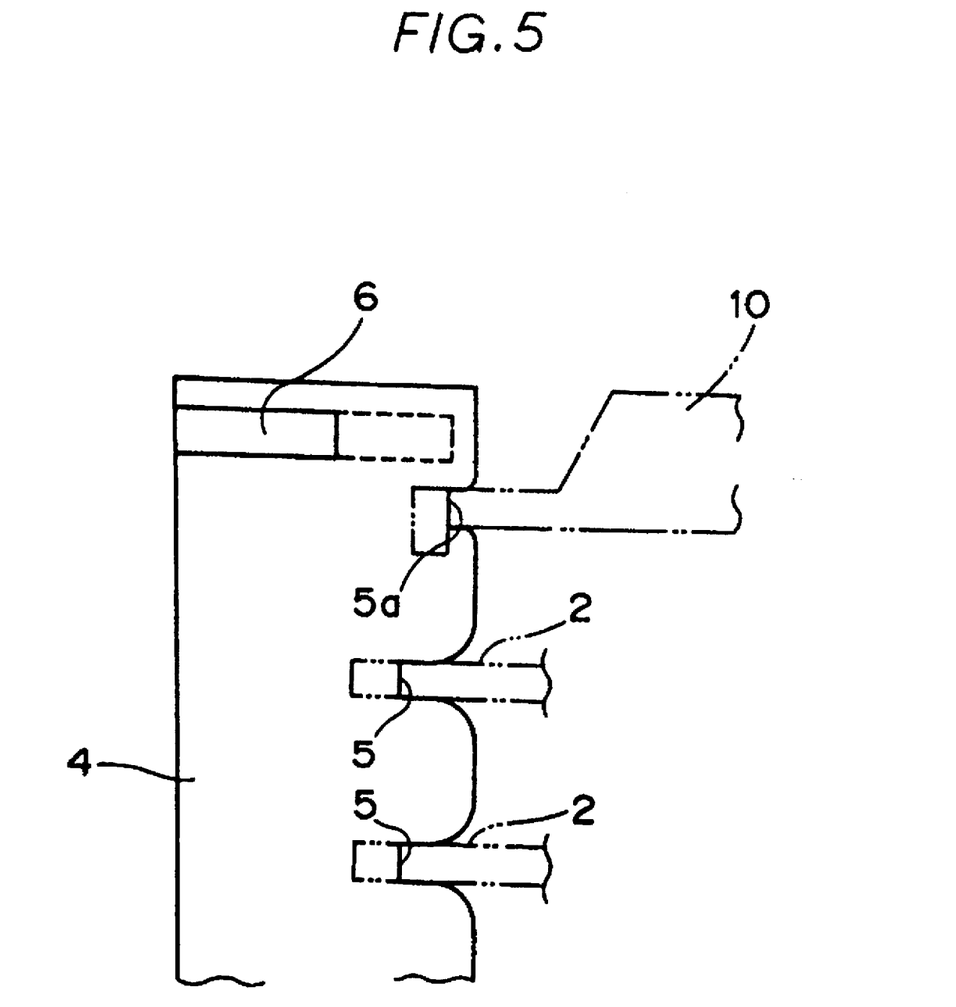
FIG. 5 is a side view showing a header tank.
Figure 6:
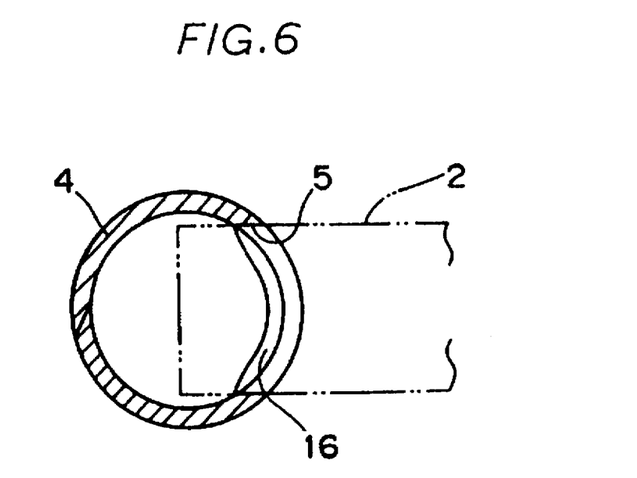
FIG. 6 is a transverse sectional view taken on line B—B in FIG. 7 showing a header tank having a flat tube inserted into an insertion port.

The header tank 4 is made of a sheet member whose surface has a brazing material claded, and as shown in FIG. 4 and FIG. 5, it is pressed to form the multiple tube insertion ports 5 and insertion ports 5a for the side plate 10 at certain intervals, then curved in the form of a cylinder as shown in FIG. 6.

Figure 7:
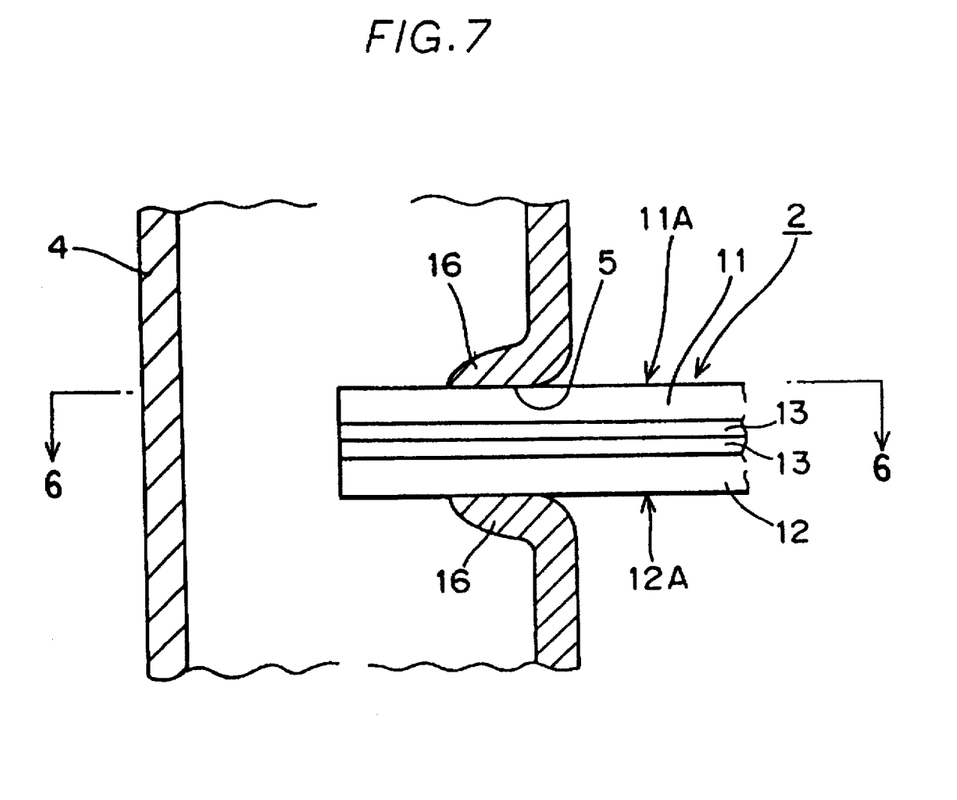
FIG. 7 is a vertical sectional view showing a header tank having a flat tube inserted into an insertion port.

As shown in FIG. 7, a bar ring 16 is formed around each of the tube insertion ports 5 toward the inside of the header tank 4 to provide a large contact area with each of the flat tubes 2.

Figure 8:
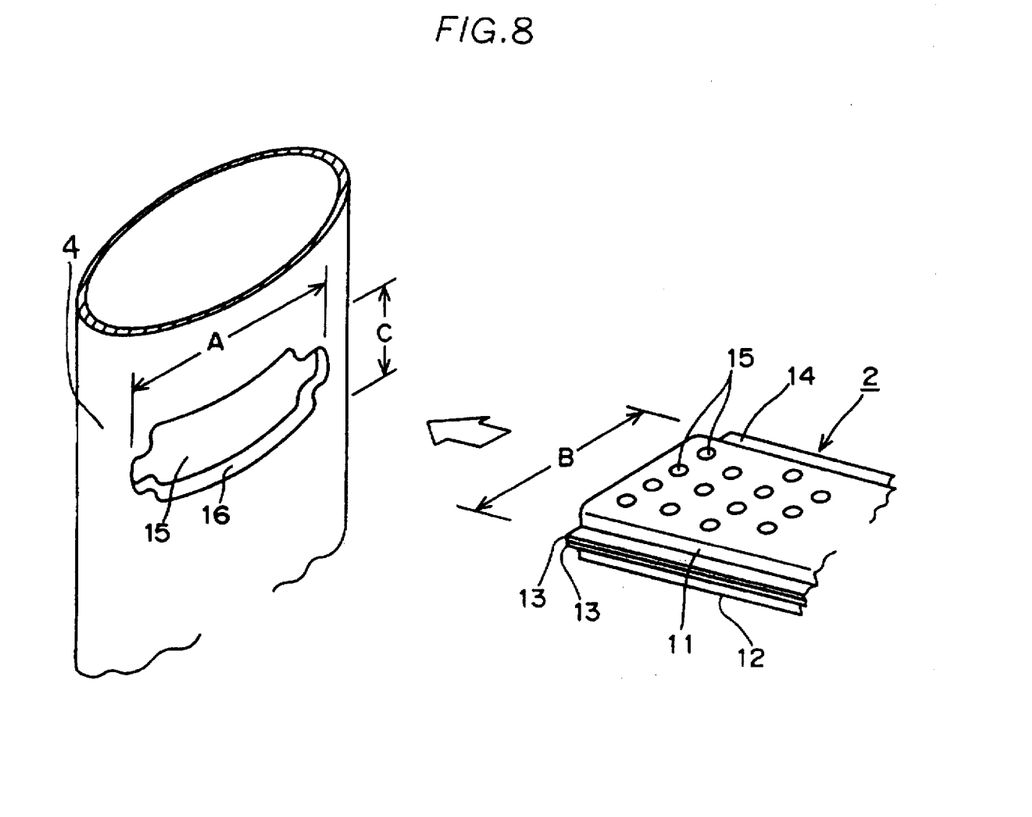
FIG. 8 is a perspective view illustrating the width of an insertion port and a flat tube.

And, as shown in FIG. 4 and FIG. 8, the tube insertion ports 5 are formed into a shape corresponding to a cross section of the flat tube 2 which is formed by overlaying the aforementioned two plates 11, 12. Specifically, they are formed to have an outer diameter shape corresponding to the flat faces 11A, 12A of the flat tube 2 and the joints 13, 14 projected from its both sides.

In this embodiment, each tube insertion port 5 has its breadth size A formed to be larger than a breadth size B of the flat tube 2, and the flat tube 2 inserted into the tube insertion port 5 can be moved in its breadth direction in a certain range within the tube insertion part 5.

In this embodiment, the breadth size A of the tube insertion port 5 is formed to be, for example, 0.1 mm to 0.4 mm larger than the breadth size B of the flat tube 2.

On the other hand, a height C of the tube insertion port 5 is formed so that it corresponds to the thickness of the flat tube 2, and after inserting the flat tube 2 into it, the flat faces 11A, 12A of the flat tube 2 are perfectly fitted to the top and bottom ends of the tube insertion port 5.

Now, the flat tube is inserted into and brazed with the tube insertion port as follows.

To assemble the laminated heat exchanger 1, a jig is used to laminate the multiple flat tubes 2 with the corrugated fins 3 between the flat tubes 2, and as shown in FIG. 1, the insertion ends of the respective flat tubes 2 are inserted into the insertion ports 5 of the header tanks 4 by a single action.

Figure 9:
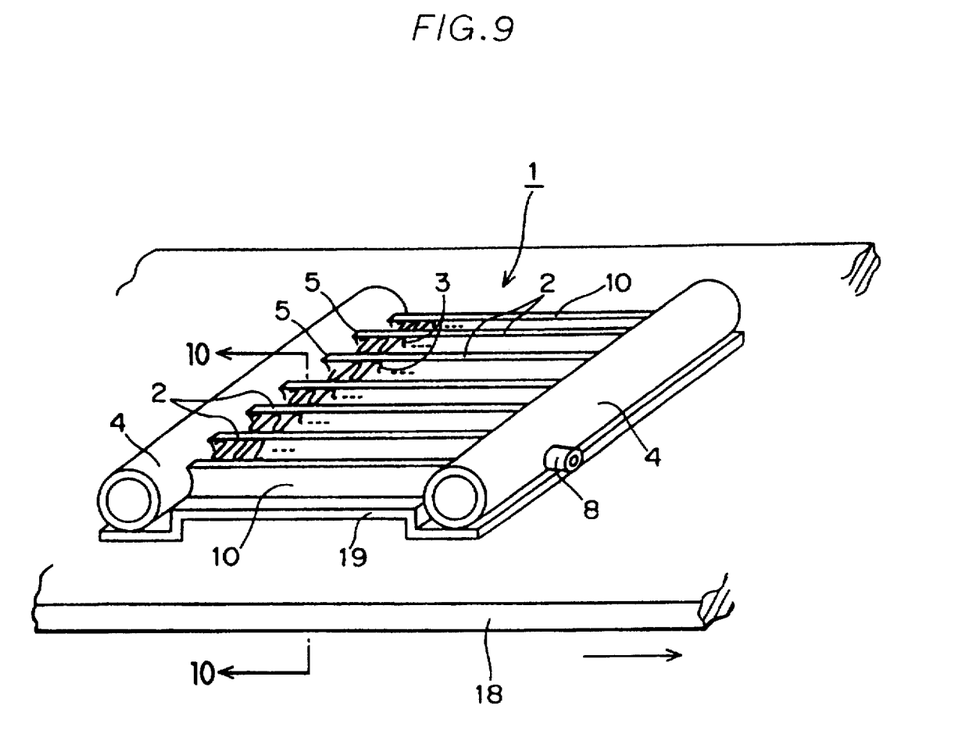
FIG. 9 is a perspective view of a laminated heat exchanger illustrating a placed condition of the flat tubes when brazing.

To braze the laminated heat exchanger 1 into a single body, as shown in FIG. 9, the assembled laminated heat exchanger 1 is placed on a conveyer belt 18 and sent into a brazing furnace. To place the laminated heat exchanger 1 onto the conveyer belt 18, the laminated heat exchanger 1 is transversely placed with the header tanks 4 made horizontal and the breadth directions of the flat tubes vertical, and carried as shown in FIG. 9. Specifically, the laminated heat exchanger 1 is positioned on the conveyer belt 18 so that the joints 13, 14 of the flat tubes 2 are positioned vertically.

To transversely place the laminated heat exchanger 1 on the conveyer belt 18, a push-up jig 19 is positioned under each flat tube 2 of the laminated heat exchanger 1, and this push-up jig 19 is in contact with the lower joints 14 of the flat tubes 2, so that the flat tubes 2 are evenly pushed up and supported with respect to the header tanks 4 as shown in FIG. 9.

Figure 10:
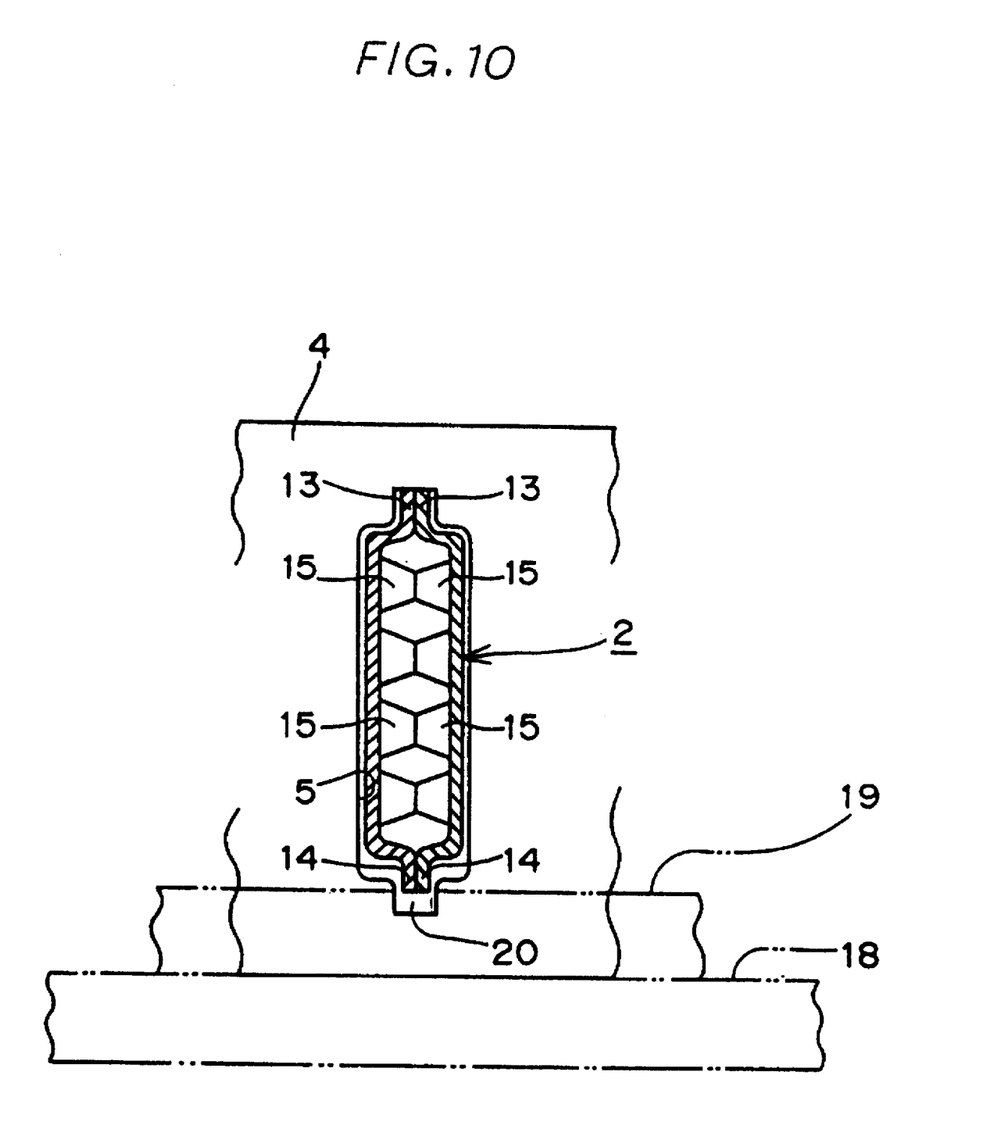
FIG. 10 is a transverse sectional view taken on line C—C in FIG. 9 illustrating the states of a flat tube and an insertion port when brazing.

As a result, each flat tube 2 is brazed under conditions that the joints 13 which are at the top of the flat tube 2 are contacted to the top end face within the tube insertion port 5 or one end face in the breadth direction of the tube insertion ports 5, and a gap 20 is formed between the joints 14 positioned at the lower part of the flat tube 2 and the lower end face within the tube insertion port 5 or the other end face in the breadth direction of the tube insertion port 5 as shown in FIG. 10.

And, when brazing integrally, the flat tubes 2 are thermally expanded, but the flat tubes 2 cannot be thermally expanded in the thickness direction because the tube insertion ports 5 are formed to have a height to completely match the flat tubes 2. The flat tubes 2 are thermally expanded in the breadth direction of the tube insertion ports 5 which have been formed to have a larger size, decreasing the size of the gap 20 at the lower ends of the tube insertion ports 5 and the flat tubes 2.

Besides, when brazing, the brazing material on the external face of the flat tube 2 flows downward to fill the gap which is formed at the lower parts of the flat tube 2 and the tube insertion port 5, thereby securely brazing the flat tube 2 and the tube insertion port 5.

The brazing material on the inner faces of the flat tube 1 adheres the joints 13, 14 and the beads 15, preventing the flat tube 2 from expanding in the thickness direction. Thus, the beads 15 can particularly be brazed surely.

Therefore, since the width of the tube insertion ports on the header tanks is made larger than the width of the flat tubes, the flat tubes can be smoothly inserted when assembling the heat changer, the flat tubes are not crushed due to tight assembling of the flat tubes, adjustment after assembling is not needed, and flat tubes of the type having two thin plates overlaid and of the type having one plate folded can be assembled without any trouble.

Besides, since the tube insertion ports have a large width, the flat tubes are not deformed even when the flat tubes are thermally expanded in the breadth direction when brazing. Thus, the conventionally experienced deformation in the thickness direction of the flat tubes can be prevented, the beads of the flat tubes near the tube insertion ports can be securely brazed mutually, the pressure resistance of the flat tubes can be improved, and they can be satisfactorily used for a condenser.

When brazing, the assembled laminated heat exchanger is transversely placed with the header tanks horizontal and the tops of the flat tubes are in contact with the top ends of the tube insertion ports, so that the gap which is formed at the lower end of each of the tube insertion ports can be fully filled with the brazing material flowing from top to bottom, the flat tubes can be firmly brazed with the tube insertion ports, and defective brazing can be prevented.

If the width of the tube insertion ports is excessively large, the gap in the tube insertion ports is not filled with the brazing material. Consequently, the gap is preferably to be large in a range of 0.1 mm to 0.4 mm according to the size of the flat tubes generally used.

The above embodiment has been described with reference to the flat tubes which are formed by overlaying two plates, but the invention is not limited to such flat tubes but can also be applied to those formed by folding one plate. And, the invention can also be applied to flat tubes having an inner fin inserted within them and those produced by an extrusion molding. In addition, the above embodiment has been described on the so-called both-tank type which has a header tank on either side but can also be applied to the so-called single-tank type.

INDUSTRIAL APPLICABILITY

The invention relates to a method for brazing flat tubes of a laminated heat exchanger which has an improved brazing property between the tube insertion ports of header tanks and the flat tubes inserted into the tube insertion ports, and which is applied to general radiators and evaporators as well as condensers which are required to have a high pressure resistance.

I claim:

1. A method for brazing flat tubes of a laminated heat exchanger comprising the steps of:

laminating a plurality of flat tubes which have a brazing material cladded with fins therebetween, inserting both ends of each flat tube into tube insertion ports of header tanks, and integrally brazing ends of the flat tubes and the tube insertion ports, wherein the tube insertion ports have a width larger than that of the flat tubes, the laminated heat exchanger is transversely placed such that a width direction of the flat tubes becomes vertical when integrally brazing after assembling, and a jig is used to support said flat tubes so as to cause upper parts of the flat tubes to contact the tube insertion ports and form gaps between lower parts of the flat tubes and the tube insertion ports before effecting brazing.

2. A method for brazing flat tubes of a laminated heat exchanger according to claim 1, wherein the width of the tube insertion ports is 0.1 mm to 0.4 mm larger than the width of the flat tubes.

3. A method for brazing flat tubes of a laminated heat exchanger comprising the steps of:

forming in a header tank at least one tube insertion port having a width greater than a width of a flat tube cladded with a brazing material and having ends;

inserting one of said ends of said flat tube into said tube insertion port to form a heat exchanger assembly;

placing said heat exchanger assembly on a jig such that a widthwise direction of said flat tube become vertical and that said flat tube contacts an upper edge of said tube insertion port, forming a gap between said flat tube and a lower edge of said tube insertion port so that when subjected to heat, said brazing material flows downwardly to fill said gap, thereby securing said flat tube to said header tank without deformation of said flat tube.

4. A method for brazing flat tubes of a laminated heat exchanger according to claim 3, wherein the width of the tube insertion port is 0.1 to 0.4 mm larger than the width of the flat tube.

* * * * *